Patented Mar. 15, 1949

2,464,758

UNITED STATES PATENT OFFICE 2,464,758

HALOGENATION OF UNSATURATED ETHERS AND PRODUCTS PRODUCED THEREBY

Paul H. Williams, Berkeley, and Theodore W. Evans, Oakland, Calif., assignors to Shell Development Company, San Francisco, Calif., a corporation of Delaware No Drawing. Application April 30, 1942, Serial No. 441,244

17 Claims. (Cl. 260—614)

This invention relates to the halogenation of unsaturated ethers and it provides a practical and economical process for the production of halo addition derivatives of unsaturated ethers, some of which derivatives are new compounds. More particularly, it provides a method whereby the yield from the halo addition reaction of such ethers may be substantially increased and/or the simultaneous halo substitution reaction appreciably diminished.

The invention resides in the application of the discovery that the yield of the halo addition products of unsaturated ethers may be very appreciably increased over that obtained by heretofore proposed methods by carrying out the halogenation of the suitable unsaturated ether in the presence of aqueous solutions of a halide or halides of the halogen being employed for the halogenation. In one of its embodiments, the invention is exemplified by the chlorination of di-allyl ether in the intimate presence of a concentrated aqueous solution of hydrochloric acid to produce beta,beta',gamma,gamma' tetrachloro-di-n-propyl ether in high yield.

It is known that bis olefinic ethers (such as di-allyl ether) may be halogenated in moderate yield via addition by effecting the reaction under conditions insuring the presence of a liquid phase in the reaction zone. However, as heretofore attempted, this halogenation procedure has been unsuccessful when applied to the olefinic ethers in which the unsaturated carbon atom is also a tertiary carbon atom (as in bis [beta methallyl] ether), since apparently the halogen substitution reaction predominates to a greater degree in the halogenation of such ethers.

Having then the object of overcoming these and other defects of the prior art, as well as producing novel compositions of matter consisting of saturated and unsaturated halogenated ethers derived via halo addition from the corresponding olefinic ethers which contained one or more unsaturated tertiary carbon atoms, it has now been found that these tertiary unsaturated ethers may be halogenated via addition (as hitherto unknown) and also that other unsaturated ethers may be halogenated via addition in greater yield than hitherto obtained, by effecting the halogenation in the presence of an aqueous solution of a halide corresponding to the halogen being employed in the halogenation. That is, in chlorinating an unsaturated ether via addition, the process is carried out in the presence of an aqueous solution of hydrogen chloride, in brominating an unsaturated ether via addition, the process is effected in the presence of an aqueous solution of bromide ion; in iodating an unsaturated ether via addition an aqueous iodide solution is similarly employed; in fluorinating an unsaturated ether via addition an aqueous fluoride solution is utilized, etc.

For best results, an amount of this aqueous halide solution necessary to maintain a substantial aqueous phase in addition to the ether phase in the reaction mixture is recommended. A preferred concentration of halide ion in the aqueous phase is from about 0.1N up to a saturated solution. When using concentrations near the lower limit, it should be remembered that the hydro- or metallic halide may transfer in considerable amount from the aqueous to the ether phase, thus reducing the concentration in the aqueous phase and thereby requiring a correspondingly higher initial concentration of the halide in the aqueous solution. Also, low concentrations of halide ion are effective in promoting this halo-adition reaction only at low temperatures. At higher temperatures more highly concentrated halide solutions and greater quantities of such concentrated solutions should be employed. It has been found convenient in the chlorination of di-allyl ether, for example, to start the chlorination with about 14 weight per cent of di-allyl ether and about 86 weight per cent of aqueous 12N–13N hydrochloric acid. This is about sixteen times the number of mols of hydrogen chloride as there are mols of ether present.

Advantage of such a heterogeneous mixture is obtained by agitating or commingling the two phases during the process of the halogenation reaction as by passing the reaction stream of molecular halogen through the mixture and/or by other suitable means.

Another advantage of the use of such an aqueous solution containing a substantial concentration of a halide ion is in the assistance it renders in helping to prevent excessive temperature in the reaction mixture. Although heat may be applied to initiate the reaction, the halogenation is exothermic in character, and hence it is generally carried out with the reaction chamber surrounded by an ice bath or other cooling device. The presence of the aqueous diluent as well as its constant circulation materially assists in dissipating the excess heat produced.

Another phase of the invention resides in the discovery that the yield of halo addition product obtained in the presence of the above-described aqueous halide ion phase is also appreciably increased by effecting the reaction at a comparatively low temperature—most conveniently in the range of temperature between the atmospheric freezing point of the higher freezing phase and the flash point of the unsaturated ether. However, the reaction may be carried out at even lower temperatures, as by operating under reduced pressure. It may also be effected at temperatures above the flash point of the ether, but as the temperature is raised it requires a much greater concentration and/or quantity of halide ion to obtain a comparable yield of the halo addition product. For those ethers containing an unsaturated tertiary carbon atom, such as beta methallyl ether and its homologues, which exhibit a greater tendency to favor the halo substitution reaction, a reaction temperature considerably lower than that employed for the corresponding non-tertiary ether should be maintained. Whereas a preferred convenient temperature for the chlor addition of di-allyl ether by the present process is from about —20° C. to about 0° C., the corresponding range for the chlor addition of methallyl ether is from about —50° C. to about —20° C.

The action of the halide in increasing the yield of the poly-halogenated ether is not due to the mere presence of the halide as was shown by an experiment wherein carbon tetrachloride saturated with anhydrous hydrogen chloride was used in place of aqueous hydrogen chloride, as herein described, in the chlorination of di-allyl ether. No substantial increase in yield was noted as was the case when the aqueous hydrogen chloride was used.

The halogenation reaction is effected in a batch, intermittent or continuous manner, and at any suitable pressure. For example, the unsaturated ether, together with the aqueous solution of halide, may be introduced into a reaction vessel and maintained therein under conditions of pressure and temperature which insure the maintenance of the ether in the liquid state, the halogen being continuously or intermittently conveyed therethrough, e.g. by bubbling with or without additional agitation, until the amount of halogen thus introduced is substantially equal to or greater than that theoretically necessary for the saturation of the olefinic linkages of the ether treated. In the alternative, the unsaturated ether and the halogen, together with the aqueous solution of halide, may be mixed and conveyed through a reaction zone wherein the reactants are maintained in a state of agitation and in contact with each other for a period of time sufficient to effect the desired halo-addition.

It has also been found that the reaction product as heretofore obtained contains impurities which may result in the evolution of hydrogen halide and discoloration of the product within a few hours. It has now been found that generally a product which remains substantially waterwhite and free of hydrogen halide over a reasonable period of time may be obtained by treating either the crude or distilled halogenated product with a weak basic-acting substance. This reagent should not be so strong as to cause dehydrohalogenation of the desired ether product and accordingly may vary in strength for each particular polyhalogenated ether. Aqueous sodium carbonate solutions of 5% to 10% have been found quite satisfactory for treating bis (beta gamma dichloro-n-propyl) ether. Any carbonate, weak hydroxide or other basic acting reagent might be used. Obviously less hydrogen halide will be evolved and less reagent used if the product is given this basic treatment after, rather than before, distillation or separation from the reaction mixture.

Among the unsaturated ethers, of which the yield of halo addition products may be increased by the present process, mention may be made of bis diolefinic ethers, particularly the non-vinyl type unsaturated ethers as reprsented by the formula

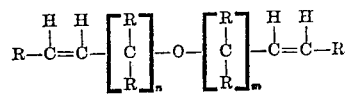

wherein each R represents a substituent which may be the hydrogen atom, or an alkyl, aryl, aralkyl, alkenyl, aralkenyl, alicyclic or hetrocyclic radical which may be further substituted, and wherein $n$ and $m$ represent like or different positive whole numbers. Of these, a particularly suitable group of ethers which may be treated according to the halo-addition process comprises the di-allyl type ethers of the general formula

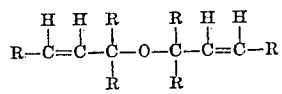

in which R represents a substituent having the same values as in the preceding formula. These ethers may be symmetrical or asymmetrical with respect to the ether oxygen atom. This preferred group comprises those di-unsaturated ethers of the defined class which are liquid under normal conditions.

The unsaturated ethers in which one or more of the unsaturated carbon atoms are tertiary—that is, directly connected to two other carbon atoms—can now be halogenated for the first time by the present process. The preferred group of these unsaturated tertiary-carbon containing ethers consists of the allyl type ethers which may be represented by the following formula:

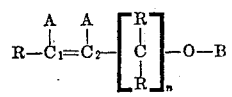

wherein R has the same value as in the preceding formulas, $n$ is a positive integer or zero, A is an alkyl, aryl, aralkyl, metallic or hydrogen radical, but at least one A must be joined to $C_1$ or to $C_2$ by a carbon atom in said A radical (that is, either $C_1$ or $C_2$ must be a tertiary carbon atom or both may be tertiary carbon atoms) and B is a substituted or unsubstituted, saturated or unsaturated aryl, alkyl, or aralkyl radical which may be the same or different from the other radical attached to the ether oxygen atom (i. e. the ether may be a symmetrical [simple] or unsymmetrical [mixed] ether).

By the halogenation of this class of ethers by the present process, there may be produced novel polyhalogenated ethers of the formula

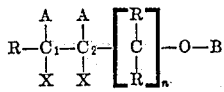

wherein X is a halogen atom and the other symbols have the same values as in the preceding formula. The many new polyhalogenated ethers of this type may be exemplified by bis (beta, gamma dichloro isopropyl carbinyl) ether (formed by the chlorination of bis [beta methallyl] ether) and bis (beta, gamma dichloro beta-chloromethyl propyl) ether (produced by the chlorination of bis [beta chloromethyl allyl]

ether). These halogenated ethers are excellent for use as solvents, intermediates for chemical syntheses and for other purposes. They may also be dehydrohalogenated by the methods known to the art to produce unsaturated halogenated ethers such as bis (gamma chloro, beta-chloromethallyl) ether which is an excellent solvent by reason of its structural configuration, as well as being of value in chemical synthesis.

The properties possessed by the whole group of these organic compounds, adapt them admirably for use in organic synthesis, as well as for other purposes. For example, the aforementioned bis (beta gamma dischloro-n-propyl) ether may be employed as a high-boiling, chlorinated solvent and extractant, being a good selective solvent for oils and for hydrocarbons. Also, the polychlorinated ether may be substituted for dichlorethyl ether and like solvents in lubricants for us in high pressure lubrication, or wherever undue volatilization of the lower boiling dichlorethyl ether would effect a breaking of the film of the lubricant.

The aforementioned polyhalogenated ethers may be employed in the manufacture of various organic compounds. For instance, they may be subjected to dehydrohalogenation, to hydration in an acid medium to form the corresponding polyhalogenated hydroxy compounds, or again to hydrolysis in a neutral or substantially neutral solution to form the corresponding ethers of polyhydric alcohols.

As an example of the outlined uses of these polyhalogenated ethers, the bis (beta gamma dichloro-n-propyl) ether (produced by the liquid phase cholorination of di-allyl ether) may be treated with a basic-acting compound under dehydrochlorinating conditions to produce bis (beta-chlor allyl) ether which is a colorless, mobile liquid with a characteristic odor. This unsaturated chlorinated ether readily polymerizes upon heating to a tough, black, rubber-like solid which is insoluble in benzene, ethyl alcohol, ethylene dichloride, acetone, and other common organic solvents. The monomeric bis (beta chlor allyl) ether may be compounded with gums, waxes, fillers, plasticizing agents, etc., to form plastic masses useful in arts.

Among the many other unsaturated ethers which may be halogenated via addition according to the present process, particular mention may be made of phenylated ethers such as phenyl allyl ether, phenyl butenyl ether, phenyl pentenyl ether and the like, their analogues, homologues and suitable substituted derivatives; halogenated ethers such as gamma, gamma' dichloroallyl ether from which higher halides containing two or more different halogens can be produced (as bis [beta, gamma dibromo gamma chloro-n-propyl] ether) as well as the bis (beta, gamma, gamma tri-chloro-n-propyl) ether, etc.

The following examples will further illustrate the various phases of the present invention, it being understood that the invention is not restricted to these examples, but is co-extensive with the scope of the appended claims.

Example I

To a heterogeneous mixture made up of 588 gms. (6.0 mols) of diallyl ether and 3570 gms. of concentrated hydrochloric acid (Sp. Grav. 1.19) was added 933 gms. (13.0 mols) of chlorine gas. The reaction mixture was vigorously stirred during the addition of chlorine and the temperature of the mixture was maintained at −5° C. to −10° C. When the addition of chlorine was completed, one volume of water was added to the product mixture and the organic layer was separated and washed with water. It was then refluxed at atmospheric pressure with 5% aqueous sodium carbonate solution until no more of the sodium carbonate was reacted. The product so treated was distilled through an efficient still and the fraction distilling between 120° C. and 124° C. at 5 mm. pressure was collected as beta, beta', gamma, gamma'-tetrachloro-di-n-propyl ether. The yield, based on di-allyl ether reacted, was 61% of the theoretical.

Example II

A heterogeneous mixture consisting of 392 gms. (4.0 mols) of di-allyl ether and 2380 gms. of concentrated aqueous hydrochloric acid (Sp. Grav. 1.19) was treated with 568 gms. (8.0 mols) of chlorine in the same manner as described in Example I. The crude chlorinated product was then fractionally distilled. The fraction containing beta, beta', gamma, gamma'-tetrachloro-di-n-propyl ether was then treated with 5% aqueous sodium carbonate until the sodium carbonate was no further reacted. By re-distillation, beta, beta', gamma, gamma'-tetrachloro-di-n-propyl ether was obtained in 58% yield, based on di-allyl ether reacted.

To illustrate the advantage of halogenating di-allyl ether in the presence of an aqueous solution containing the halide ion, the following example in which di-allyl ether alone was treated with chlorine is submitted.

Example III

To 392 gms. (4.0 mols) of di-allyl ether was added 639 gms. (9.0 mols) of chlorine in the same manner as in the previous examples. The crude chlorinated product was treated with 5% aqueous sodium carbonate solution, as in the case of Example I, and distilled through an efficient column. A 34% yield of beta, beta', gamma, gamma'-tetrachloro-di-n-propyl ether was obtained. Comparison of the results of the experiment with the results of the experiments described in Examples I and II clearly demonstrates the superiority of halogenation in the presence of halide ion solution.

The following example is submitted to show the effect of temperature on the yield of halo addition product by the present process:

Example IV

To a heterogeneous mixture consisting of 392 grams (4.0 mols) of diallyl ether and two liters of concentrated hydrochloric acid was added 568 grams (8.0 mols) of chlorine at the rate of 1.7 grams/minute. The temperature was maintained at about 27° C. The chlorine was completely reacted and no hydrogen chloride was evolved during the reaction. The chlorinated product was treated with sodium carbonate solution in the above manner and 3.1 mols of hydrogen chloride were split off. By distillation of the hydrolyzed product, 365 grams of beta, beta', gamma, gamma'-tetrachloro-di-n-propyl ether were obtained, representing a yield of only 38 per cent. In addition to the tetrachloro ether, the hydrolyzed product mixture contained approximately 15 per cent by weight of allyl, beta, gamma-dichloropropyl ether, identified by the distilling temperature, and about 17 per cent by

We claim as our invention:

1. A process for the production of bis (beta, gamma dichloro-n-propyl) ether which comprises reacting liquid di-allyl ether with chlorine in the presence of an aqueous liquid phase of about 12N-13N hydrochloric acid, said aqueous liquid phase constituting about 86% by weight of the initial reaction mixture, agitating the two phases and maintaining a temperature of about −20° C. to about 0° C. during the reaction, separating bis (beta, gamma dichloro-n-propyl) ether from the reaction mixture and treating it with an aqueous solution of sodium carbonate which has a concentration of from about 5% to about 10% at about room temperature.

2. A process for the production of bis (beta, gamma dischloro-n-propyl) ether which comprises reacting liquid di-allyl ether with chlorine in the presence of a concentrated aqueous solution of hydrochloric acid in such an amount that two liquid phases are present in the reaction mixture, agitating the reaction mixture during the reaction, and separating bis (beta, gamma dichloro-n-propyl) ether from the reaction mixture.

3. In a process for the production of bis (beta, gamma dichloro-n-propyl) ether by chlorination via addition of di-allyl ether the improvement which comprises, effecting the chlorination in the presence of a heterogenous mixture of said ether and an aqueous solution of hydrogen chloride having a chloride ion concentration of at least 0.1 normal.

4. In a process for the production of bis (beta, gamma dihalo-n-propyl) ether by halogenation via addition of di-allyl ether the improvement which comprises, effecting the halogenation in the presence of a heterogeneous mixture of said ether and an aqueous solution of the hydrogen halide of the halogen being used in the halogenation said solution having a halide ion concentration of at least 0.1 normal.

5. A process for the production of a bis (beta, gamma dischloro, beta alkyl propyl) ether by chlorination via addition of a bis (beta alkyl allyl) ether, which process comprises reacting the liquid unsaturated ether with chlorine at a temperature substantially below that of the flash point of the unsaturated ether and in the presence of an aqueous liquid phase of concentrated hydrochloric acid, said aqueous liquid phase containing about 16 times the number of mols of hydrogen chloride as there are mols of ether in the ether phase, and separating the resulting halo-addition product.

6. Bis (beta, gamma dichloro, beta methyl propyl) ether.

7. Bis (beta, gamma dichloro, beta chloromethyl propyl) ether.

8. A polyhalogenated ether wherein one of the radicals is attached to the ether oxygen atom by an alkylene group and contains two halogen atoms on vicinal carbon atoms at least one of which carbon atoms is tertiary and the other radical attached to the ether oxygen atom is any organic radical including the first described tertiary-carbon atom-containing radical.

9. A process for the chlorination via addition of an unsaturated ether wherein at least one unsaturated carbon atom to be chlorinated is connected to two other carbon atoms, which process comprises chlorinating the ether in the liquid phase with molecular chlorine at a low temperature and in the presence of an aqueous solution a hydrogen chloride having a concentration of chloride ion of at least 0.1 normal and separating the resulting chlorinated ether.

10. A process for the halogenation via addition of an unsaturated ether wherein at least one unsaturated carbon atom to be halogenated is connected to two other carbon atoms, which process comprises halogenating the ether in the liquid phase with molecular halogen at a low temperature and in the presence of an aqueous solution of hydrogen halide containing a substantial concentration of halide ion of the halogen being employed for halogenation, and separating the resulting halogenated ether.

11. In a process for the production of a chlorinated ether by chlorination via addition of an unsaturated ether the improvement which comprises, effecting the chlorination in the presence of an aqueous solution of hydrogen chloride having a concentration of chloride ion of at least 0.1 normal and at a temperature below that at which the chlorine substitution reaction predominates.

12. In a process for the production of a halogenated ether by halogenation via addition of an unsaturated ether the improvement which comprises, effecting the halogenation in the presence of an aqueous solution of hydrogen halide containing a substantial concentration of the halide ion of the halogen being used for halogenation and at a temperature below that at which the halogen substitution reaction predominates.

13. A process for the halogenation via addition of an unsaturated ether wherein at least one of the organic radicals attached to the ether oxygen atom is an allyl-type hyrocarbon radical, which comprises effecting the halogenation in the presence of an aqueous solution of hydrogen halide containing a substantial concentration of the halide ion of the halogen being used for halogenation.

14. A process for the halogenation via addition of an unsaturated ether wherein at least one of the organic radicals attached to the ether oxygen atom is an allyl-type hydrocarbon radical containing at least one unsaturated tertiary carbon atom, which comprises effecting the halogenation in the presence of an aqueous solution of hydrogen halide containing a substantial concentration of halide ion of the halogen being used for halogenation.

15. In a process for the production of a chlorinated ether by chlorination via addition of an unsaturated ether wherein each radical attached to the ether oxygen atom is an aliphatic hydrocarbon radical containing an olefinic linkage in allyl position between two non-tertiary carbon atoms, the improvement which comprises effecting the chlorination in the presence of a heterogeneous mixture of said ether and an aqueous solution of hydrogen chloride having a chloride ion concentration of at least 0.1 N whereby addition of two atoms of chlorine to each of said olefinic linkages takes place and a polychlorinated ether is produced.

16. In a process for the production of a halogenated ether by halogenation via addition of an unsaturated ether wherein each radical attached to the ether oxygen atom is an aliphatic hydrocarbon radical containing an olefinic linkage in allyl position between two non-tertiary carbon atoms, the improvement which comprises effecting the halogenation in the presence of a heterogeneous mixture of said ether and an aqueous solution of the hydrogen halide of the halogen being used for halogenation, said solution having a halide ion concentration of at least 0.1 N whereby addition of two atoms of said halogen to each of said olefinic linkages takes place and a polyhalogenated ether is produced.

17. In a process for the production of a chlorinated ether by chlorination via addition of an unsaturated ether wherein each radical attached to the ether oxygen atom is a hydrocarbon radical containing an olefinic linkage in non-vinyl position between two carbon atoms, each of which is directly linked to at least one hydrogen atom, the improvement which comprises effecting the chlorination in the presence of a heterogeneous mixture of said ether and an aqueous solution of hydrogen chloride having a chloride ion concentration of at least 0.1 N whereby addition of two atoms of chlorine to each of said olefinic linkages takes place and a polychlorinated ether is produced.

PAUL H. WILLIAMS.
THEODORE W. EVANS.

REFERENCES CITED

The following references are of record in the file of this patent:

UNITED STATES PATENTS

| Number | Name | Date |
|---|---|---|
| 1,248,065 | Blanc | Nov. 27, 1917 |
| 1,953,286 | Barth | Apr. 3, 1934 |
| 2,042,219 | Groll | May 26, 1936 |
| 2,161,737 | Coleman | June 6, 1939 |

FOREIGN PATENTS

| Number | Country | Date |
|---|---|---|
| 301,009 | Great Britain | Nov. 19, 1928 |
| 425,061 | Great Britain | Oct. 23, 1934 |

OTHER REFERENCES

Markownikow Zeitschrift fur Chemie (1865), page 554.

Henry, "Berichte deut. Chem. Gess.," vol. 5 (1872), page 455.

Chemical Abstracts, vol. 24, pp. 337 and 338 (1930).

Chemical Abstracts, vol. 32, pp. 7891, (1936).

(Literature references above are all available in the Scientific Library.)

Beilstein, "Handbuch der Org. Chem.," vol. 1, 2nd supplement, pp. 370 and 398.

Certificate of Correction

Patent No. 2,464,758.

March 15, 1949.

PAUL H. WILLIAMS ET AL.

It is hereby certified that errors appear in the printed specification of the above numbered patent requiring correction as follows:

Column 5, line 14, and column 7, line 19, claim 2, for "dischloro-n-propyl" read *dichloro-n-propyl*; line 46, claim 5, for "dischloro" read *dichloro*; and that the said Letters Patent should be read with these corrections therein that the same may conform to the record of the case in the Patent Office.

Signed and sealed this 21st day of June, A. D. 1949.

[SEAL]

THOMAS F. MURPHY,
*Assistant Commissioner of Patents.*